Jan. 11, 1955  A. F. HASBROOK  2,699,544
DISTANCE MEASURING SYSTEM
Filed March 30, 1949  2 Sheets-Sheet 1
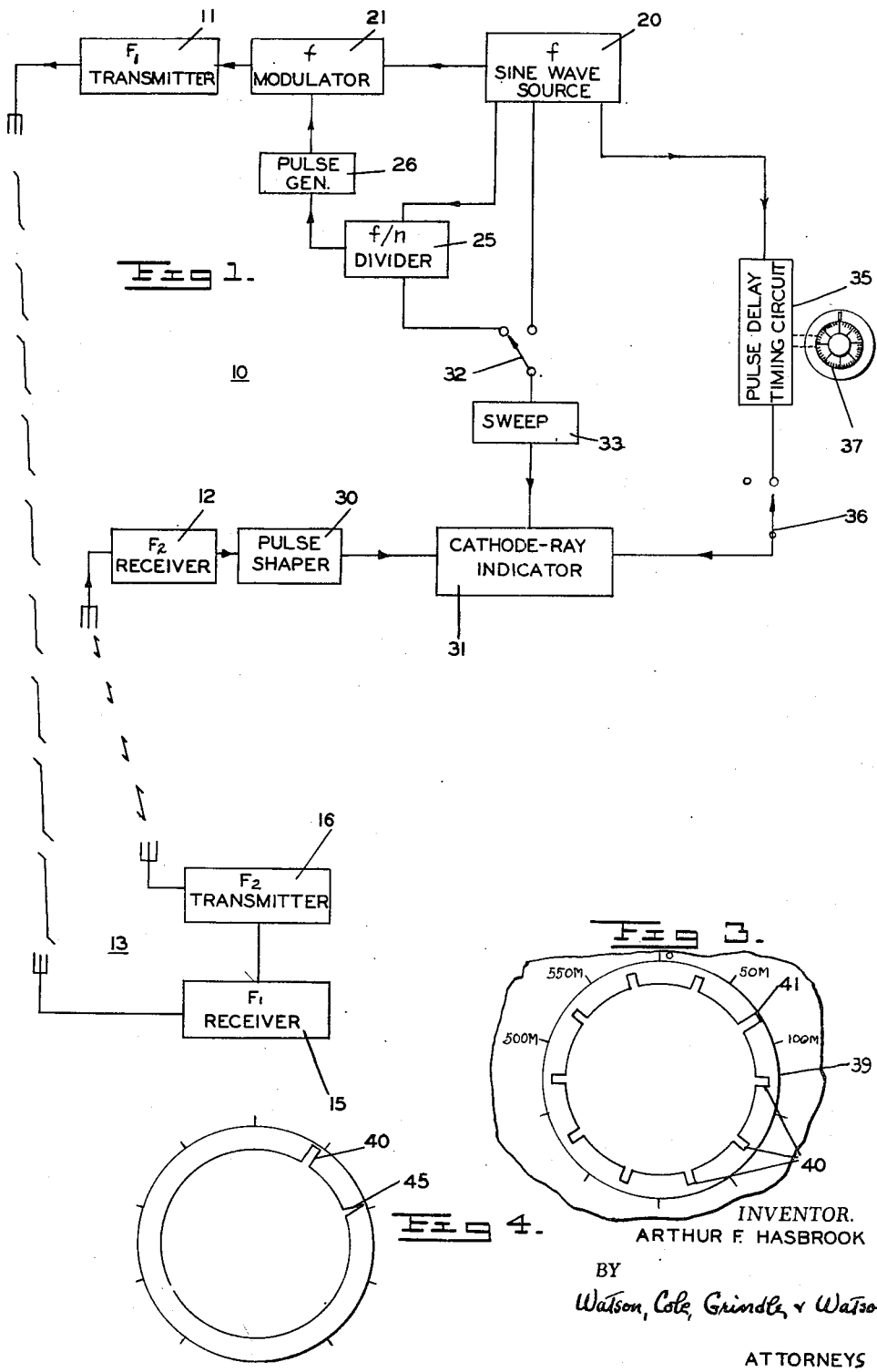
INVENTOR.
ARTHUR F. HASBROOK
BY
Watson, Cole, Grindle & Watson
ATTORNEYS

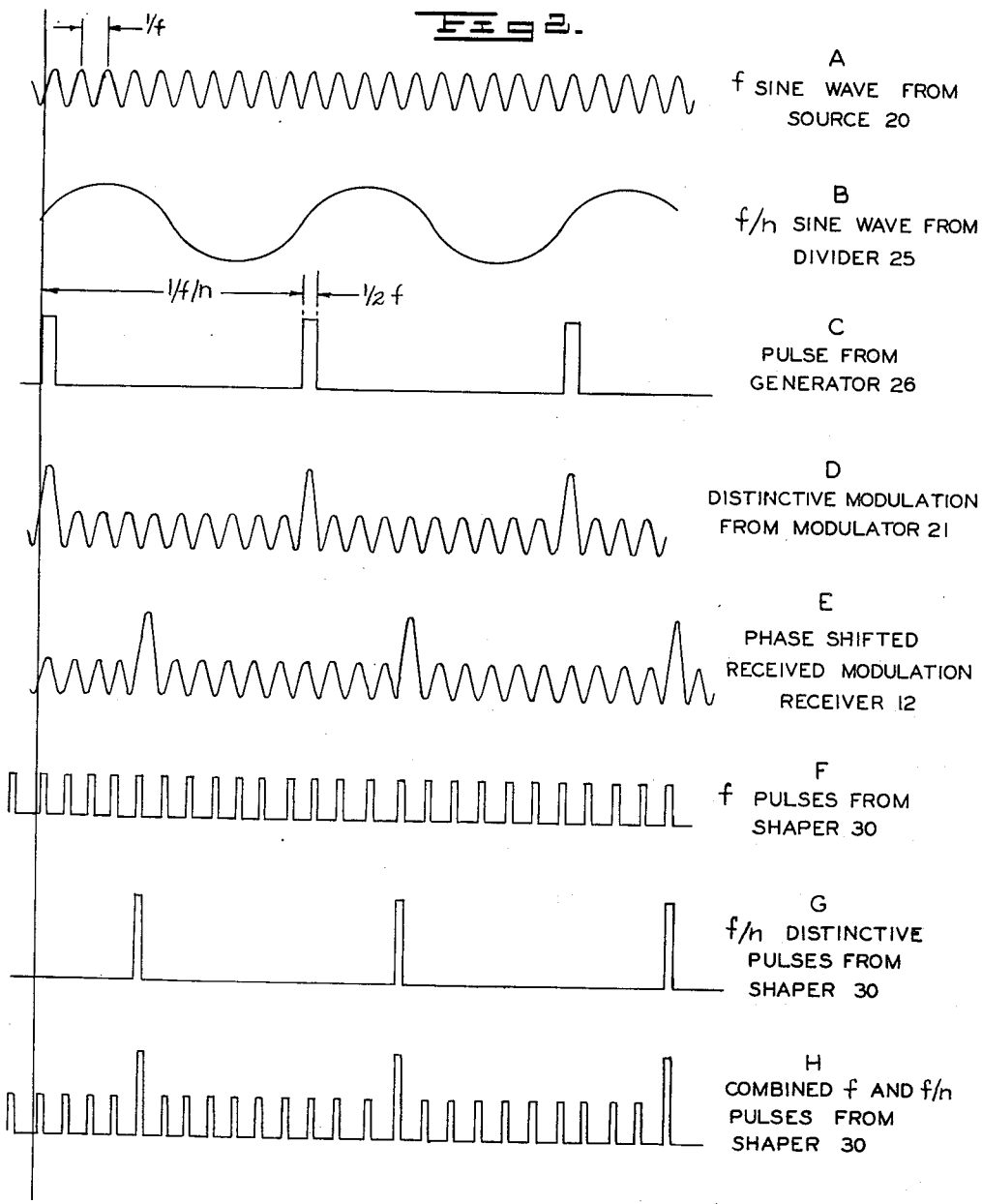

United States Patent Office 2,699,544
Patented Jan. 11, 1955

2,699,544

DISTANCE MEASURING SYSTEM

Arthur F. Hasbrook, San Antonio, Tex., assignor to Olive S. Petty, San Antonio, Tex.

Application March 30, 1949, Serial No. 84,359

8 Claims. (Cl. 343—12)

This invention relates to improvements in methods and apparatus for use in the electronic measurement of distances by transmission of radio signals, and has for its principal object the provision of a simplified system affording a high degree of accuracy of measurement over a wide range of distances.

It is a common expedient, in the measurement of distance by radio signaling, to transmit a timing signal from a master station to a distant repeater station at which the signal is reflected, or is received and again transmitted, for reception at the master station. The interval of time which elapses between the transmission of the initial signal from the master station and the arrival of the retransmitted signal, adjusted to compensate for delays inherent in the circuits employed, is then a measure of the distance between the two stations.

In measuring systems heretofore designed it has been common practice to transmit and receive timing signals in the form of pulses to facilitate indication and measurement of signal displacement resulting from lapsed transmission time and circuit delays. However, there are striking advantages in the use of continuous wave signals for this purpose, principally in reduction of interference with other communication systems, provided adequate accuracy can be achieved and ambiguities avoided.

It is therefore an object of the instant invention to provide a system of measurement utilizing a continuous wave signal in which the wave form is appropriately modified at intervals to provide distinctive marking, whereby ambiguities in determining distances may readily be resolved.

More specifically, it is an object of the invention to provide, in a system of the class described, a radio system transmitting and receiving a signal in the form of a modulated carrier wave in which the modulating energy comprises a sine wave which is distorted or otherwise altered in shape or amplitude at regular intervals to provide distinctive marking, whereby the extent of delay or displacement in transmission may be roughly determined by noting the displacement of the marked portion of the wave.

A further object of the invention is the provision of apparatus facilitating accurate measurement of displacement by varying the range of a visual indicator on which the phase of the signal energy is represented.

Further objects and features of the invention will be apparent from the following description taken in connection with the accompanying drawing, in which Figure 1 is a block diagram representing a distance measuring system embodying the principles of the instant invention;

Figure 2 represents a series of curves, designated A to H, indicative of the nature of the signal energy at various points in the system of Figure 1; and Figures 3 and 4 represent traces on a cathode ray oscillograph such as may be produced by the system of Figure 1.

While the invention is described with reference to the measurement of distance by radio transmission and with the use of conventional equipment as represented in the annexed drawings, it will be understood that such further uses of the inventive concept and various adaptations and modifications of the system elements are contemplated as would occur to those skilled in the art to which the invention relates.

Referring to Figure 1 of the drawing, it will be observed that a master station 10 is illustrated diagrammatically as provided with a transmitter 11 and a receiver 12. Various equipment components at the master station are conventional and the details thereof form no part of the instant invention. It will be understood, however, that in accordance with common practice in this field, signal energy is radiated by the transmitter 11 at the master station 10 to one or more base or repeater station 13, at each of which the signal is received and retransmitted to the receiver 12 at the master station. Suitable equipment is employed at the master station to measure the elapsed time between transmission and reception of the signal and thereby to determine the distance to the base station or stations.

Figure 1 also discloses diagrammatically the essential components at each of the base or repeater stations, namely a receiver 15 for the signals radiated by the master station 10, and a transmitter 16 for radiating the received signal to the receiver 12 at the master station 10. Although the transmitter 16 may function merely to reradiate the signal received by the receiver 15, the arrangement is preferably such that the transmitter 16 is controlled by the output of receiver 15 to radiate a signal related to the received signal.

As hereinbefore indicated, it is a feature of the invention that the signal transmitted between the stations is a modulated carrier wave in which the modulating frequency is a continuous wave, for example, a sine wave, modified at intervals to facilitate measurement of delay in transmission. This may be achieved by apparatus such as that shown in Figure 1, the modulating frequency being supplied from a sine wave oscillator 20, having a frequency $f$, through a modulator 21 to the transmitter 11. The transmitter provides a carrier wave of frequency $F_1$, which is modulated by a sine wave and radiated in the conventional manner. Part of the energy derived from sine wave source 20 is fed to a frequency divider 25 which delivers a wave of frequency $f/n$ to a pulse generator 26, the output of which is combined in modulator 21 with the sine wave from source 20 so as to modify or distort the sine wave periodically, whereby distinctive marking of every $n$th wave is achieved.

A convenient method of marking involves increase in amplitude of the selected sine wave peaks by simple combination of the pulse derived from generator 26 with the modulating sine wave. It will be appreciated, however, that by conventional methods the combination may be so effected as to reduce the amplitude of every $n$th wave or otherwise to distort the wave so that the selected peaks may be distinguished from those intervening. All such methods are described herein by the term "marking" and the modified or distorted peaks are referred to herein as the distinctively marked waves. To facilitate further description, it will be assumed that $n=10$, and that on every tenth cycle the modulating wave is distinctively marked.

As hereinbefore explained, the signal radiated by transmitter 11 at the master station 10, modulated as described, is received and reradiated at one or more base or repeater stations 13. Preferably the signal energy is received and demodulated in receiver 15 and the modulation supplied to a carrier $F_2$ frequency for radiation by transmitter 16, being again received and detected or demodulated in receiver 12 at master station 10.

The output of receiver 12 is supplied to a pulse shaper 30, in which the modulation peaks are formed into pulses for convenience in measuring, the distinctively marked waves being represented by distinctive pulses, for instance pulses of greater amplitude. The pulses are then supplied to a cathode-ray indicator 31, the sweep 33 of which is energized selectively at frequency $f$, derived from source 20, or at frequency $f/n$, derived from divider 25, depending on the position of switch 32.

A timing pulse is also supplied to cathode-ray indicator 31. This may be derived from sine wave source 20, a suitable sequence of pulses being formed and delayed in pulse delay timing circuit 35, the output of which is supplied to indicator 31 through switch 36. The delay applied to the timing pulse is adjusted in any conventional manner, ... control knob 37, rotated to effect the adjustment, is supplied with a dial which may be calibrated to indicate the extent of the delay, or the distance in feet over which a signal could be transmitted during an equivalent period.

Figure 2 represents a series of waves such as may be obtained at various points in the system thus far described, it being understood that the nature of these waves may vary substantially from that shown. Thus at A is shown the modulating continuous wave, in this instance a sine wave of frequency $f$, from source 20; B represents the output of divider 25 at frequency $f/n$. The wave shown at B may be shaped as shown at C in generator 26, and applied to the initial wave A, the combined wave form produced in modulator 21 being illustrated at D.

The wave E is representative of the output of receiver 12; the form of the wave is essentially that shown at E, but delay in transmission has resulted in displacement. Wave form E may now be broken into components by suitable limiters in shaper 30, and the components shaped to pulses as shown at F and G. Combination of these pulses produces the form shown in H, which is supplied to a cathode ray tube, or the like, for display.

In Figure 3 is shown a trace which might be produced on a cathode ray screen having a circular sweep when used in conjunction with indicator 31 of Figure 1, the screen being provided with a scale 39 graduated to represent transmission distances in feet corresponding to signal displacements of integral cycles of $f$ modulation frequency. Since $n=10$, and the sweep is energized from the sine wave divider 25, having a frequency of $f/10$, nine unmarked pulses 40 and one marked pulse 41, of greater amplitude, appear on the screen. The position of the marked pulse 41 indicates roughly the extent of displacement, so that on inspection of the scale the distance over which the signal has been transmitted may be determined with sufficient accuracy to avoid ambiguities such as may arise when the phase displacement exceeds one cycle. Assuming that scale 39 is initially adjusted to position the zero reading at the point of display of pulse 41 when the transmission distance is zero, the scale reading immediately lower than the position of pulse 41 invariably indicates in feet the transmission distance represented by phase displacement of transmission pulses through whole cycles. For this purpose a timing pulse is not required, and switch 36 may be open.

If switch 36 be closed, timing pulses may also be placed on the screen. By adjusting knob 37 to alter the delay imposed by delay timing circuit 35 to the extent required to bring the timing pulses into contiguous relation to or into alignment with pulses 40, a reasonably accurate reading of the transmission distance may be directly obtained. However, in order to aid the operator in establishing exact alignment of the timing and transmission pulses, I prefer to increase the sweep speed before taking a final reading. Thus by manipulating switch 32, the sweep 33 may be energized directly from sine wave source 10, so that on each rotation of the cathode ray only one pulse 40 will be displayed. The pulses shown in Figure 3 will thus coincide, as shown in Figure 4, and on closing switch 36 a timing pulse 45 will also be shown on the screen. Knob 37 is provided with a graduated scale giving in feet the transmission distance represented by the extent of adjustment of the timing circuit to align the timing and transmission pulses, and corresponding to phase displacement of transmission pulses through a fractional part of a cycle. By adding this reading in feet to the reading obtained on scale 39, the total transmission distance is found.

It will be appreciated that the configuration of the continuous wave by which the carrier is modulated is not important, provided it affords a periodic sequence of regular cycles followed by a distinctive or marked cycle. Similarly, conversion of the returned signal into pulses is convenient for measuring purposes, although not essential to the practice of the invention in its broader aspects, and within the limits imposed by the appended claims.

Having thus described the invention, what is claimed as new and desired to be secured by Letters Patent is:

1. In electronic apparatus for measuring distance between a master station and a remote station of the type comprising a signal transmitter at the master station, means at the remote station for returning to the master station a signal related to the transmitted signal, and means at the master station for comparing the phase displacement of the returned signal with the transmitted signal, the combination at the master station of a transmitter for modulated carrier wave signal energy, including means for generating and radiating a carrier wave, a source for generating a continuous modulating wave, means for distorting periodically said modulating wave to provide recurrent marked cycles, said last named means including a frequency divider energized from said source, and means combining the output of said frequency divider with said continuous modulating wave, means modulating said radiated carrier with said distorted modulating wave, a receiver for the returned related signal, means deriving a timing signal from said source, and devices for indicating relative phase displacement between said returned signal and said timing signal.

2. In electronic apparatus for measuring distance between a master station and a remote station of the type comprising a signal transmitter at the master station, means at the remote station for returning to the master station a signal related to the transmitted signal, and means at the master station for comparing the phase displacement of the returned signal with the transmitted signal, the combination at the master station of a transmitter for modulated carrier wave signal energy, including means for generating and radiating a carrier wave, a source for generating a continuous modulating wave, means for distorting periodically said modulating wave to provide recurrent marked cycles, said last named means including a frequency divider energized from said source, and means combining the output of said frequency divider with said continuous modulating wave, means modulating said radiated carrier with said distorted modulating wave, a receiver for the returned related signal, means deriving a timing signal from said source, and devices for indicating relative phase displacement between said returned signal and said timing signal, said devices comprising a cathode ray indicator having a circular sweep, means supplying said returned and timing signals to said indicator, and means selectively operable to energize said sweep either from said source or from said divider.

3. In electronic apparatus for measuring distance between a master station and a remote station of the type comprising a signal transmitter at the master station, means at the remote station for returning to the master station a signal related to the transmitted signal, and means at the master station for comparing the phase displacement of the returned signal with the transmitted signal, the combination at the base station of a transmitter for modulated carrier wave signal energy, including means for generating and radiating a carrier wave, a source for generating a continuous modulating wave, means for distorting every $n$th cycle only, $n$ being an integer greater than 1, of said modulating wave to provide recurrent marked cycles, means modulating said radiated carrier with said distorted modulating wave, a receiver for the returned related signal, means deriving a timing signal from said source, including an adjustable delay circuit for said timing signal, a cathode ray tube, and means supplying said returned and timing signals to said tube, whereby said signals may be displayed in coincidence by adjusting said delay circuit to indicate relative phase displacement between said returned signal and said timing signal.

4. In electronic apparatus for measuring distance between a master station and a remote station of the type comprising a signal transmitter at the master station, means at the remote station for returning to the base station a signal related to the transmitted signal, and means at the master station for comparing the phase displacement of the returned signal with the transmitted signal, the combination at the master station of a transmitter for modulated carrier wave signal energy, including means for generating and radiating a carrier wave, a source for generating a continuous modulating wave, means for distorting every $n$th cycle only, $n$ being an integer greater than 1, of said modulating wave to provide recurrent marked cycles, means modulating said radiated carrier with said distorted modulating wave, a receiver for the returned related signal, means deriving a timing signal from said source, and devices for indicating relative phase displacement between said returned signal and said timing signal.

5. In electronic apparatus for measuring distance between a master station and a remote station of the type comprising a signal transmitter at the master station, means at the remote station for returning to the master station a signal related to the transmitted signal, and means at the master station for comparing the phase displacement of the returned signal with the transmitted signal, the combination at the base station of a transmitter for modulated carrier wave signal energy, including means for generating and radiating a carrier wave, a source for generating a continuous modulating wave, means for distorting every $n$th cycle only, $n$ being an integer greater than 1, of said modulating wave to provide recurrent marked cycles, means modulating said radiated carrier with said distorted modulating wave, a receiver for the returned related signal, means deriving a timing signal from said source, and devices for indicating relative phase displacement between said returned signal and said timing signal, said devices comprising a cathode ray indicator, and means supplying said returned and timing signals to said indicator.

6. In electronic apparatus for measuring distance between a master station and a remote station of the type comprising a signal transmitter at the master station, means at the remote station for returning to the master station a signal related to the transmitted signal, and means at the master station for comparing the phase displacement of the returned signal with the transmitted signal, the combination at the master station of a transmitter for modulated carrier wave signal energy, including means for generating and radiating a carrier wave, a source for generating a continuous modulating wave, means for distorting every $n$th cycle only, $n$ being an integer greater than 1, of said modulating wave to provide recurrent marked cycles, means modulating said radiated carrier with said distorted modulating wave, a receiver for the returned related signal, means deriving a timing signal from said source, and devices for indicating relative phase displacement between said returned signal and said timing signal, said devices comprising a cathode ray indicator, and means supplying said returned and timing signals to said indicator, a sweep for said indicator, and means selectively operable to supply energy from said source to said sweep either at the frequency of the modulated wave or at the frequency of the recurrent marked cycles thereof.

7. In electronic apparatus for measuring distance between a master station and a remote station of the type comprising a signal transmitter at the master station, means at the remote station for returning to the master station a signal related to the transmitted signal, and means at the master station for comparing the phase displacement of the returned signal with the transmitted signal, the combination at the master station of a transmitter for modulated carrier wave signal energy, including means for generating and radiating a carrier wave, a source for generating a sine wave, means for distorting every $n$th cycle only, $n$ being an integer greater than 1, of said sine wave to provide recurrent marked cycles, means modulating said radiated carrier with said distorted sine wave, a receiver for demodulating the returned related signal, means deriving a timing signal from said source, and means for indicating relative phase displacement between said returned signal and said timing signal.

8. In electronic apparatus for measuring distance between a master station and a remote station of the type comprising a signal transmitter at the master station, means at the remote station for returning to the master station a signal related to the transmitted signal, and means at the master station for comparing the phase displacement of the returned signal with the transmitted signal, the combination at the master station of a transmitter for modulated carrier wave signal energy, including means for generating and radiating a carrier wave, a source for generating a sine wave, a frequency divider energized from said source, means for combining the output of said divider with said sine wave to provide a sine wave having recurrent marked cycles, means modulating said radiated carrier with said marked sine wave, a receiver for receiving and demodulating the returned related signal, means deriving a timing signal from said source, and means for indicating relative phase displacement between said returned signal and said timing signal.

References Cited in the file of this patent

UNITED STATES PATENTS

| Number | Name | Date |
|---|---|---|
| 2,171,536 | Bingley | Sept. 5, 1939 |
| 2,248,727 | Strobel | July 8, 1941 |
| 2,405,239 | Seeley | Aug. 6, 1946 |
| 2,412,964 | Chatterjea | Dec. 24, 1946 |
| 2,414,469 | Isbister | Jan. 21, 1947 |
| 2,415,920 | Thomas | Feb. 18, 1947 |
| 2,444,388 | De Vries | June 29, 1948 |

FOREIGN PATENTS

| Number | Country | Date |
|---|---|---|
| 784,425 | France | July 22, 1935 |